Aug. 7, 1923.  
I. E. SISK  
1,464,371
SPARE TIRE HOLDER
Filed June 21, 1922
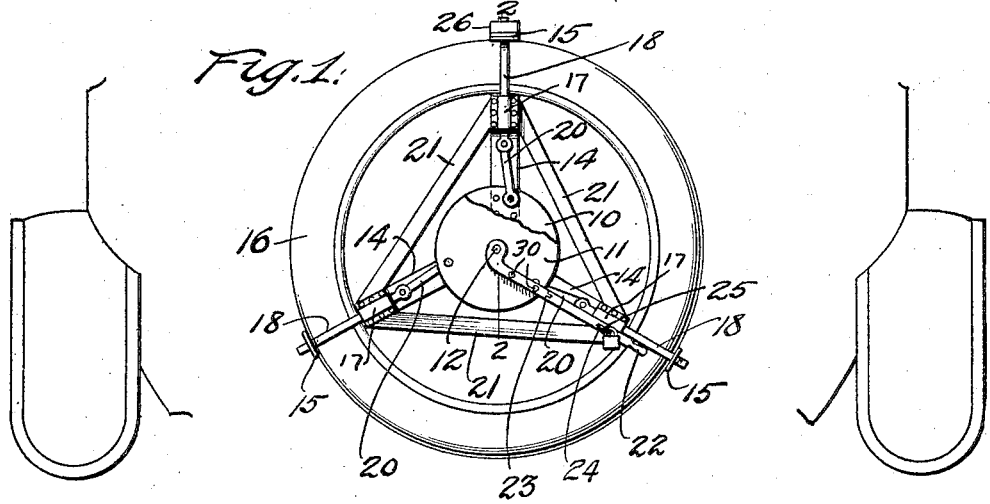
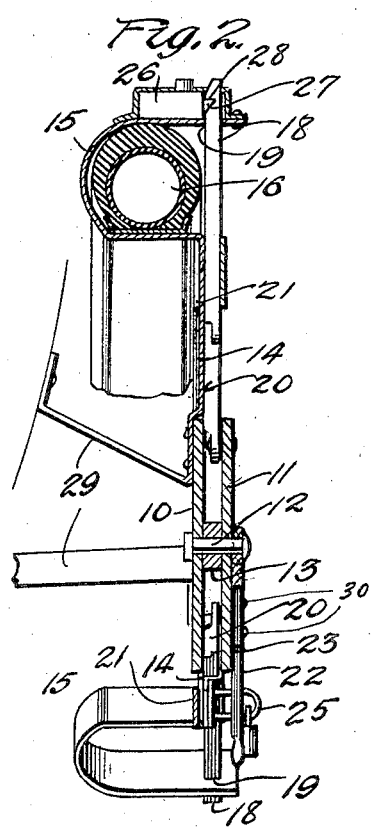
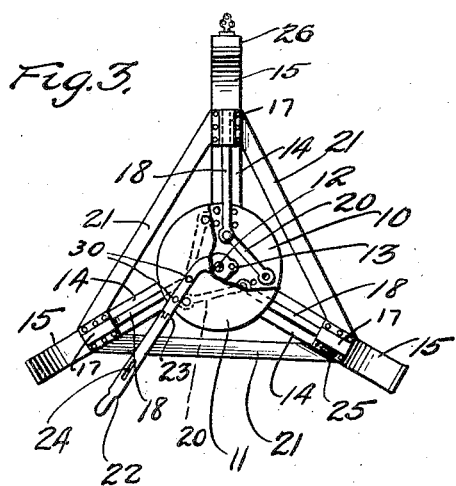
Inventor  
Ira E. Sisk
By
Attorney Patented Aug. 7, 1923.

1,464,371

UNITED STATES PATENT OFFICE.

IRA E. SISK, OF EAST ST. LOUIS, ILLINOIS.

SPARE-TIRE HOLDER.

Application filed June 21, 1922. Serial No. 569,804.

*To all whom it may concern:*

Be it known that I, IRA E. SISK, a citizen of the United States, residing at East St. Louis, in the county of St. Clair, State of Illinois, have invented certain new and useful Improvements in Spare-Tire Holders; and I do hereby declare the following to be a full, clear, and exact description of the invention, such as will enable others skilled in the art to which it appertains to make and use the same.

This invention relates to new and useful improvements in racks and particularly to racks for use in supporting spare tires on the rear ends of automobiles.

One object of the invention is to provide a device of this character which will securely hold the tire in proper position, and wherein the tire will be protected from theft.

Another object is to provide novel and improved means for securing the tire in the rack or holder, which can be easily and quickly operated to engage or release the tire, additional means being provided for locking the tire engaging means, so that the same cannot be operated without the use of a key.

Other objects and advantages will be apparent from the following description when taken in connection with the accompanying drawings.

In the drawings:

Figure 1 is an elevation of the spare tire rack or holder, in proper position with respect to a portion of the back of an automobile, and with a tire.

Figure 2 is an enlarged vertical longitudinal central sectional view on the line 2—2 of Figure 1.

Figure 3 is an elevation of the device when unlocked and the tire removed.

Referring particularly to the accompanying drawings, 10 and 11 represent a pair of metal disks, disposed in vertical parallel planes, and receiving in their centers the shaft 12. A spacing block 13 is disposed on the shaft, between the disks, to hold the disks in proper spaced relation. Secured to the forward face of the disk 10, and extending radially therefrom, are the flat metal arms 14, the outer end of each of which is formed with a curved hook-like portion 15, of a size to receive the rim and spare tire 16, said hook portions being arranged in a circular line, as clearly seen in the drawings.

On the outer face of each of the arms 14, inwardly of the hook portion 15, is an inverted channel plate 17, and slidable through each of these channel plates is a locking bolt 18. The outer end of each of the arms, is extended inwardly beyond the plane of the body of the arm, and is provided with an angular opening 19, for the reception of the outer end of the bolt 18. Pivotally connected to the inner face of the disk 11, adjacent the periphery thereof, are the links or arms 20, each having its other end pivotally connected to the inner end of a bolt 18. As shown in the drawings, there are three of the arms 14, and extending between the outer ends thereof, just inwardly of the hook portions 15, are the brace arms 21. Mounted on the outer end of the shaft 12 and secured at 30 to the disk 11, is a radially extending lever 22, the outer portion of which is hinged, to the inner portion at 23, and is formed with an opening or slot 24, for receiving the staple 25, mounted on the outer end of one of the arms 14, said staple being arranged to receive a padlock, such as is shown in Figure 1, for locking the lever against movement. Thus, by rotating the lever 22 about the shaft 12, the disk 11 will be rotated and cause the sliding of the bolts 18 through the medium of the links 20. The bolts 18 are thus moved across the portions 15 so as to hold or release the tire.

Secured to the outer end face of the hook portion of one of the arms 14, is a lock 26, the bolt 27, of which, is arranged to engage in the notch 28 formed in the outer end of the bolt 18, and whereby the bolts 18 may not be moved except when a key is used to release the bolts 27. Should a person succeed in removing the padlock, the bolts 27 would still prevent operation of the bolts 18, and thereby prevent removal of the tire and rim from the holder.

The holder is secured to an automobile by means of suitable brackets 29, carried by the disk 10.

What is claimed is:

1. A spare tire holder including a stationary member, radial arms on the stationary member having tire receiving portions on their outer ends, a rotatable member supported on the stationary member, bolts longitudinally slidable on the radial arms and engaged through the tire receiving portions of the arms, and links on the rotatable member and connected with the bolts for moving the latter transversely of the tire receiving portions.

2. A spare tire holder including a stationary member, radial arms carried by the stationary member and having guides on their outer ends, the said arms having tire receiving means on their outer ends and apertured extensions, bolts slidable through the guides and apertured extensions, a rotatable member mounted on the stationary member, links pivotally connected to the rotatable member and to the bolts, means for rotating the rotatable member, and means for locking the bolts against slidable movement.

3. A spare tire holder including a stationary disk, radial arms carried by the disk and having tire receiving portions on their outer ends and guides adjacent said ends, said tire receiving portions having apertured extensions aligning with the said guides, bolts slidable through the guides and apertured extensions, the outer ends of the bolts being formed with notches, locks on the arms releasably engaged in said notches, a rotatable disk mounted on the stationary disk, an operating lever on the rotatable disk, means for locking the lever against movement, and links pivotally carried by the rotatable disk and pivotally connected with the said bolts.

In testimony whereof, I affix my signature, in the presence of two witnesses.

IRA E. SISK.

Witnesses:
 EDNA M. VOGT,
 WM. D. DONALDSON.